United States Patent
Zhovnirovsky et al.

(10) Patent No.: US 8,113,721 B1
(45) Date of Patent: Feb. 14, 2012

(54) OFF-AXIS MISALIGNMENT COMPENSATING FIBER OPTIC CABLE INTERFACE

(75) Inventors: Igor Zhovnirovsky, Newton, MA (US); Subhash Roy, Lexington, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 101 days.

(21) Appl. No.: 12/581,799

(22) Filed: Oct. 19, 2009

Related U.S. Application Data

(63) Continuation-in-part of application No. 12/483,616, filed on Jun. 12, 2009.

(51) Int. Cl.
| | |
|---|---|
| G02B 6/38 | (2006.01) |
| G02B 6/12 | (2006.01) |
| G02B 6/26 | (2006.01) |
| G02B 6/32 | (2006.01) |
| G02B 6/36 | (2006.01) |
| G02B 6/44 | (2006.01) |
| G02B 6/00 | (2006.01) |

(52) U.S. Cl. .............. 385/74; 385/14; 385/31; 385/32; 385/33; 385/34; 385/70; 385/73; 385/76; 385/88; 385/92; 385/93; 385/94; 385/100; 385/139

(58) Field of Classification Search ............... 385/14, 385/31, 32, 33, 34, 70, 73, 74, 76, 88, 92, 385/93, 94, 100, 139
See application file for complete search history.

(56) References Cited

U.S. PATENT DOCUMENTS

| | | | | |
|---|---|---|---|---|
| 2001/0048793 | A1* | 12/2001 | Dair et al. | 385/92 |
| 2005/0185900 | A1* | 8/2005 | Farr | 385/93 |
| 2008/0232737 | A1* | 9/2008 | Ishigami et al. | 385/14 |
| 2008/0266638 | A1* | 10/2008 | Shinoda et al. | 359/237 |
| 2009/0202244 | A1* | 8/2009 | Jin et al. | 398/67 |

* cited by examiner

*Primary Examiner* — Brian M. Healy
*Assistant Examiner* — Hung Lam
(74) *Attorney, Agent, or Firm* — Law Office of Gerald Maliszewski; Gerald Maliszewski

(57) ABSTRACT

An off-axis misalignment compensating fiber optic cable plug is provided. The plug has a cable interface to engage a fiber optic core end, where the fiber optic core has a cross-sectional area. The plug also includes a lens having a first surface to transceive an optical signal with a jack. The first surface has a cross-sectional area at least 30 times as large as the core cross-sectional area. The lens has a second surface to transceive optical signals with the fiber optic line core end. In one aspect, the lens has an axis and the lens first surface is convex with a radius of curvature capable of receiving an optical signal beam with a beam axis of up to ±2 degrees off from the lens axis. Even 2 degrees off-axis, the lens is able to focus the beam on the fiber optic line core end.

23 Claims, 11 Drawing Sheets

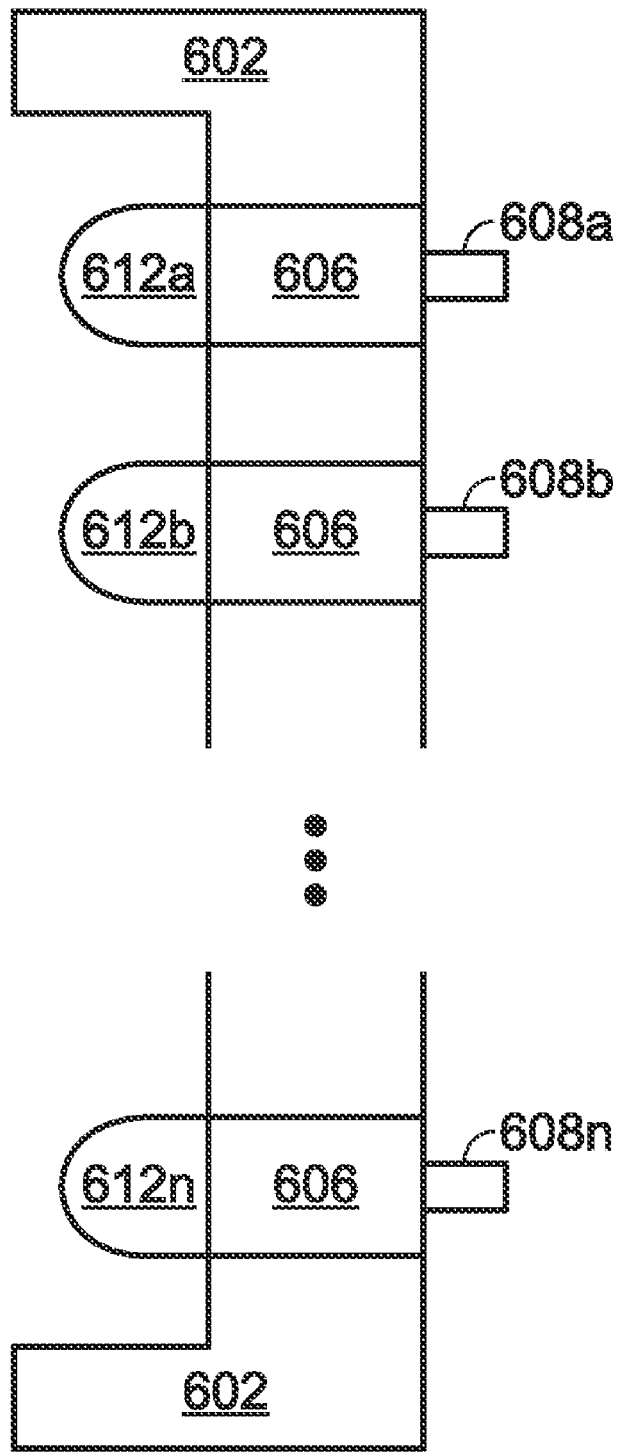

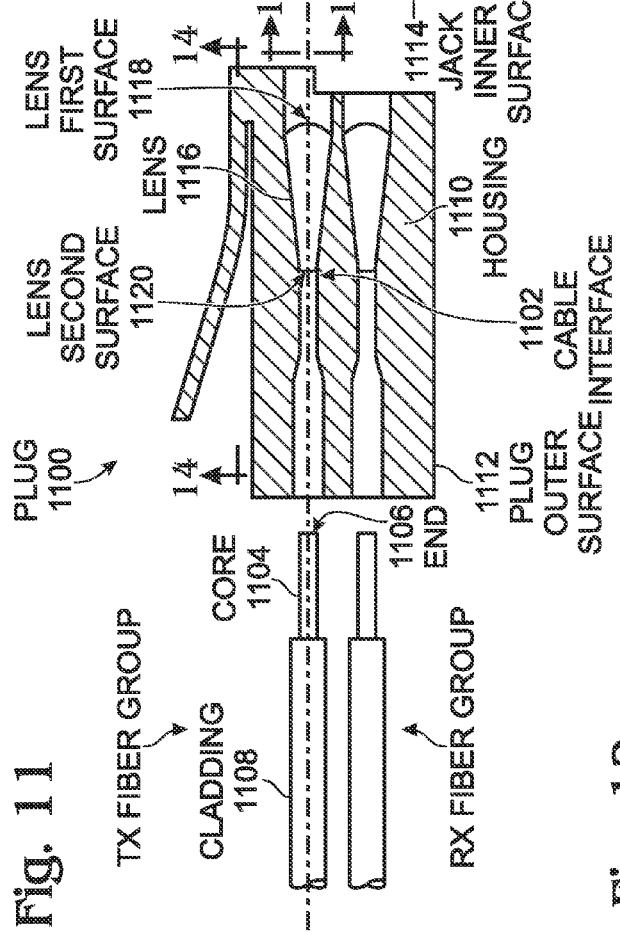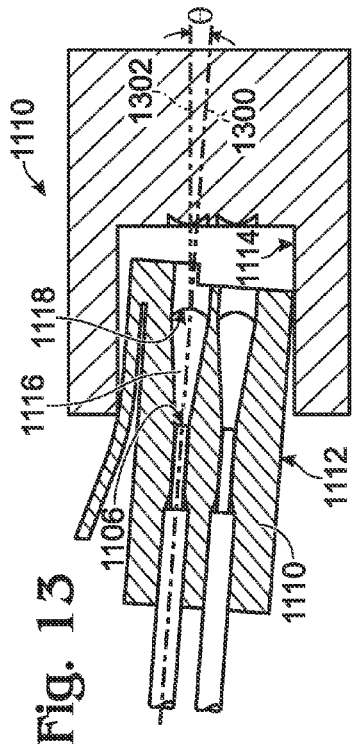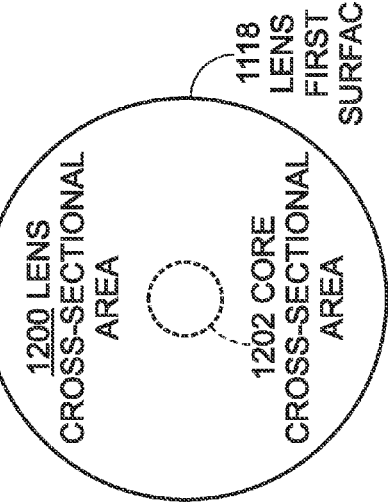

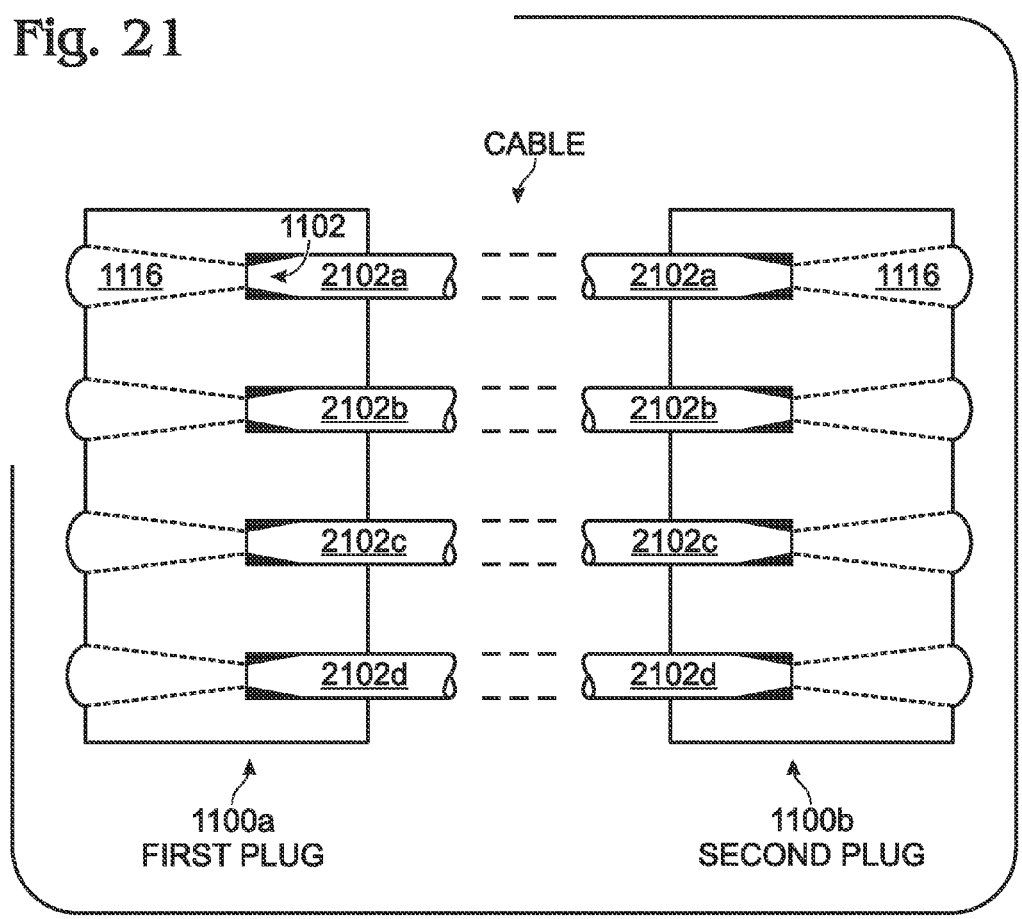

OFF-AXIS MISALIGNMENT COMPENSATING FIBER OPTIC CABLE INTERFACE

RELATED APPLICATIONS

This application is a Continuation-in-Part of a pending application entitled, FIBER OPTIC CABLE INTERFACE, invented by Igor Zhovnirovsky et al., Ser. No. 12/483,616, filed Jun. 12, 2009, which is incorporated herein by reference.

BACKGROUND OF THE INVENTION

1. Field of the Invention

This invention generally relates to optical cables and, more particularly, to a fiber optical cable interface with a misalignment compensation mechanism.

2. Description of the Related Art

Conventionally, optical fiber connectors are spring-loaded. The fiber endfaces (optical interfaces) of the two connectors are pressed together, resulting in a direct glass to glass or plastic to plastic, contact. The avoidance of glass-to-air or plastic-to-air interfaces is critical, as an air interface results in higher connector losses. However, the tight tolerances needed to eliminate an air interface make these connectors relatively expensive to manufacture.

FIG. 1 is a partial cross-sectional view of a Transmission Optical SubAssembly (TOSA) optical cable plug (prior art). The plug 100 is made from a plastic housing 102 with a bored ferrule 106 to secure an optical fiber 108. The plug 100 also includes a plastic lens 110, manufactured as a subassembly, integrated into the plug. The lens 110 has a curved surface to create a focal plane where the plug mates with a jack 112. The lens permits a low loss air gap to be formed between the plug and a connecting jack. In addition to the expense of manufacturing a 2-part plug, the plug must be made to relatively tight tolerances, so that the lens focal plane aligns with the jack, which also increases the cost of the plug.

FIG. 2 is a partial cross-sectional view of an 8 Position 8 Contact (8P8C) interface (prior art). The ubiquitous 8P8C connector is a hardwired electrical connector used commercially and residentially to connect personal computers, printers, and routers. The 8P8C is often referred to as RJ45. Although the housing/body can be made as a one-piece plastic molding, the spring-loaded contacts and the necessity of cable crimping add to the complexity of manufacturing the part. Advantageously however, the spring-loaded contacts permit the part to be made to relatively lax tolerances.

It would be advantageous if an optical cable jack and plug could be made more inexpensively with a relaxed set of mechanical and optical tolerances.

SUMMARY OF THE INVENTION

A fiber optic cable, plug, and jack are provided. The cable is made from a cable section including at least one length of fiber optic line. A first plug includes a mechanical body with a cable interface to engage the fiber optic line first end, and a microlens to transceive light with the cable interface. The first plug is shaped to engage a first jack housing. A second plug includes a mechanical body with a cable interface to engage the fiber optic line second end, and a microlens to transceive light with the cable interface. The second plug is shaped to engage a second jack housing. In one aspect, the first and second plug mechanical bodies have a form factor of an 8 Position 8 Contact (8P8C) plug mechanical body.

According, an off-axis misalignment compensating fiber optic cable plug is provided. The plug has a cable interface to engage a fiber optic core end, where the fiber optic core has a cross-sectional area. A housing has an outer surface for mechanically engaging a jack housing inner surface. The plug also includes a lens having a first surface to transceive an optical signal with a jack. The first surface has a cross-sectional area at least 30 times as large as the core cross-sectional area. The lens has a second surface to transceive optical signals with the fiber optic line core end. In one aspect, the lens has an axis and the lens first surface is convex with a radius of curvature capable of receiving an optical signal beam with a beam axis of up to ±2 degrees off from the lens axis. Even 2 degrees off-axis, the lens is able to focus the beam on the fiber optic line core end.

Additional details of the above-described fiber optical cable plug, as well as a fiber optical cable jack, and fiber optical cable assembly are provided below.

BRIEF DESCRIPTION OF THE DRAWINGS

FIG. 7 is a plan view depicting a variation of fiber optic cable jack of FIG. 6B.

FIG. 11 is a partial cross-sectional view depicting an off-axis misalignment compensating variation of the fiber optic cable plug of FIG. 5.

FIG. 12 is a cross-sectional view of FIG. 11, contrasting the lens first surface and core cross-sectional areas.

FIG. 13 is a partial cross-sectional view of the plug of FIG. 11, where the connecting jack is misaligned.

FIG. 21 is a cross-sectional view depicting an off-axis misalignment compensating fiber optic cable assembly.

DETAILED DESCRIPTION

Figure 3:
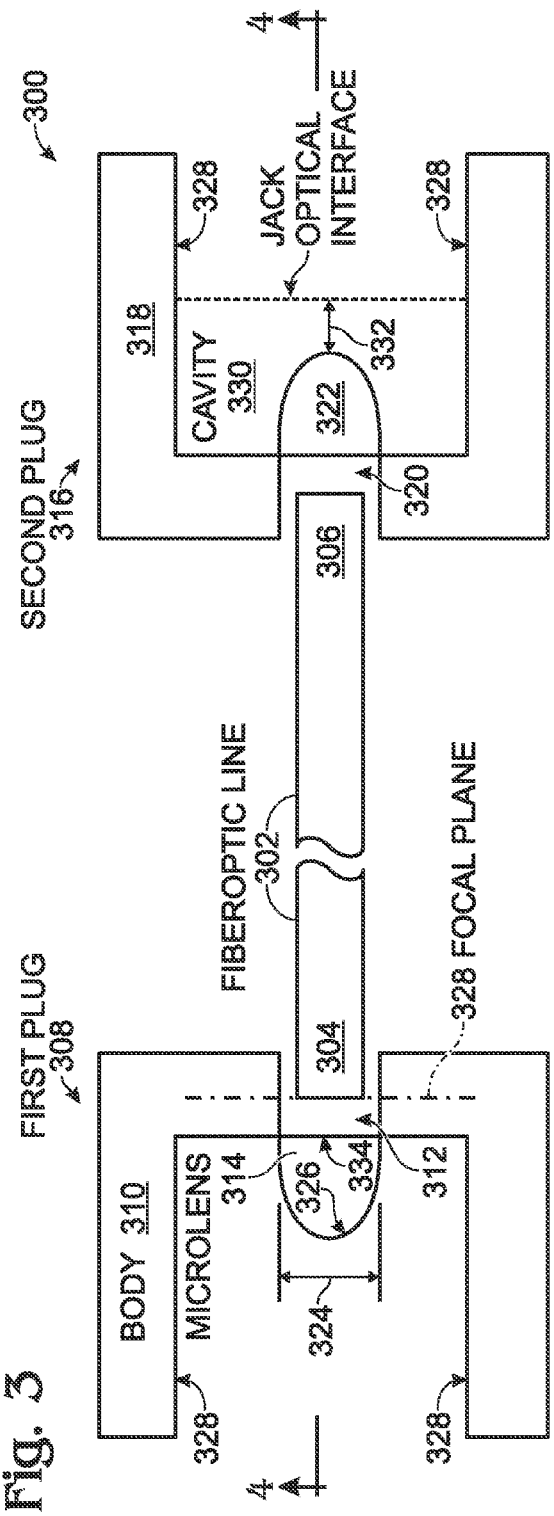
FIG. 3 is a partial cross-section view of a fiber optic cable.

FIG. 3 is a partial cross-section view of a fiber optic cable. The fiber optic cable 300 comprises a cable section including at least one length of fiber optic line 302 having a first end 304 and a second end 306. A first plug 308 includes a one-piece mechanical body 310 with a cable interface 312 to engage the fiber optic line first end 304, and a microlens 314 to transceive light with the cable interface 312. The first plug 308 is shaped to engage a first jack housing (not shown, see FIG. 6). A second plug 316 also includes a one-piece mechanical body 318 with a cable interface 320 to engage the fiber optic line second end 306, and a microlens 322 to transceive light with the cable interface 320. The second plug is shaped to engage a second jack housing (not shown). For example, the one-piece mechanical bodies 310/318 may be an injection molded plastic material.

Figure 8:
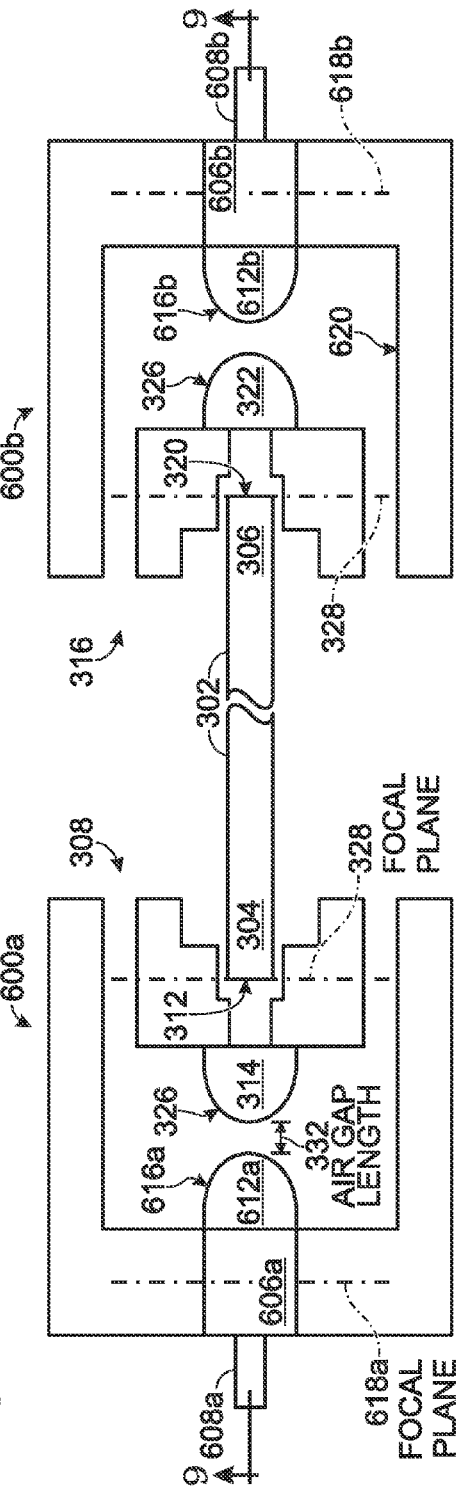
FIG. 8 is a partial cross-sectional view of a fiber optic cable interface.

In one aspect, the first and second plug mechanical bodies 310/318 have a form factor of an 8 Position 8 Contact (8P8C) plug mechanical body (see FIG. 8). This is not to say that the optical cable 300 need necessarily be mated to a conventional 8P8B electrical jack, but rather, that the mechanical bodies 310/318 can be interfaced with the next generation optical cable that will be replacing the 8P8C electrical cable. However in one aspect, the mechanical bodies can be interfaced with an 8P8C form factor jack that incorporates the electrical contacts of a convention 8P8C connector, but also includes at least one optical interface. It should be noted, however, that the fiber optic cable is not limited to any particular jack form factor.

Typically, each microlens (e.g., microlens 314) has a diameter 324 in the range of about 1-3 millimeters (mm). As shown, each microlens (e.g., microlens 314) includes a convex surface 326 for interfacing with a jack optical interface (not shown). Each cable interface (e.g., cable interface 312) is formed in the focal plane 328 of its corresponding microlens. That is, the fiber ends 304 and 306 are in the focal plane 328. Note: the microlens as shown has a convex surface 326 for interfacing with a jack optical interface and a planar surface 334 adjacent the cable interface. However, the microlens is not limited to any particular shape or combination of surface shapes. A variety of lens designs are known in the art.

The mechanical bodies (e.g., body 310) form an air gap cavity 330 interposed between the microlens convex surface 326 and an engaging jack optical interface (not shown). The air gap cavity 330 has an air gap length 332 in the range of 0.1 to 1 mm.

At least a portion of the mechanical bodies 310/318 are transparent in a range of light wavelengths between 650 and 1800 nanometers (nm), and the microlenses 314/322 are formed in the transparent portion of the mechanical bodies. Note: if the connectors are used to transceive light in wavelengths outside the above-specified range, housing materials can be designed explicitly for this range, or materials can be used to more broadly transmit in the above-specified range, as well wavelengths outside this range.

Figure 4:
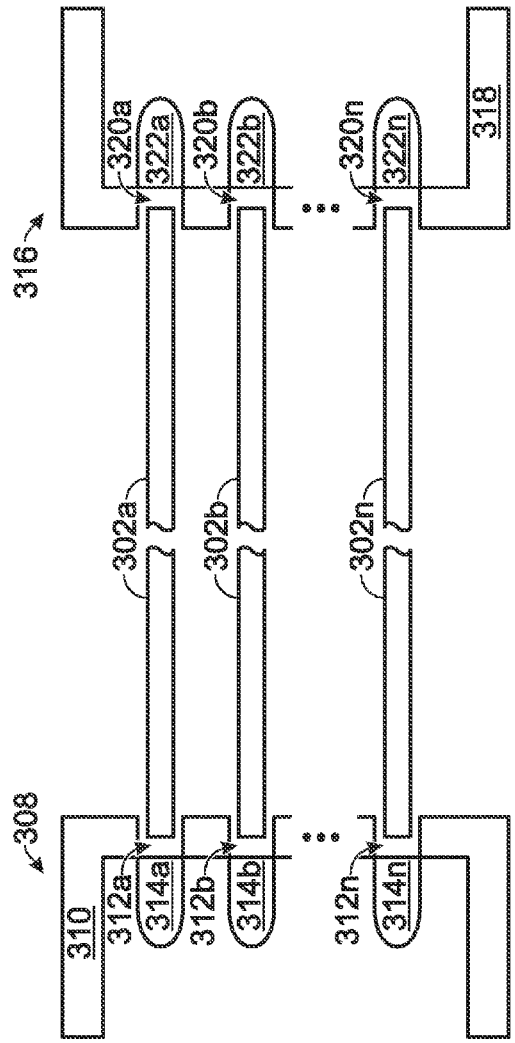
FIG. 4 is a plan view of a variation of the optical cable of FIG. 3.

FIG. 4 is a plan view of a variation of the optical cable of FIG. 3. In this aspect the cable includes a plurality of fiber optic lines 302a through 302n, where n is a variable not limited to any particular value. The first plug 308 has a cable interface 312a-312n and microlens 314a-314n associated with each fiber optic line. Likewise, the second plug 316 has a cable interface 320a-320n and microlens 322a-322n associated with each fiber optic line.

Figure 1:
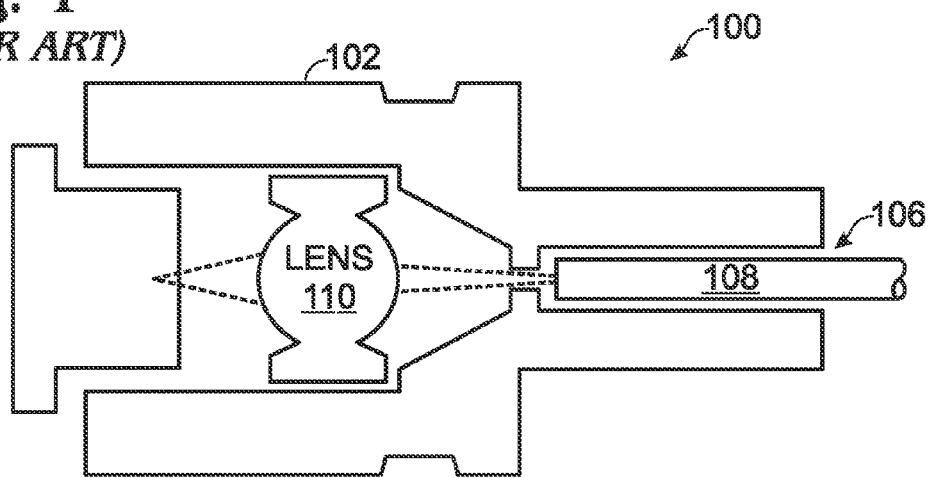
FIG. 1 is a partial cross-sectional view of a Transmission Optical SubAssembly (TOSA) optical cable plug (prior art).
Figure 2:
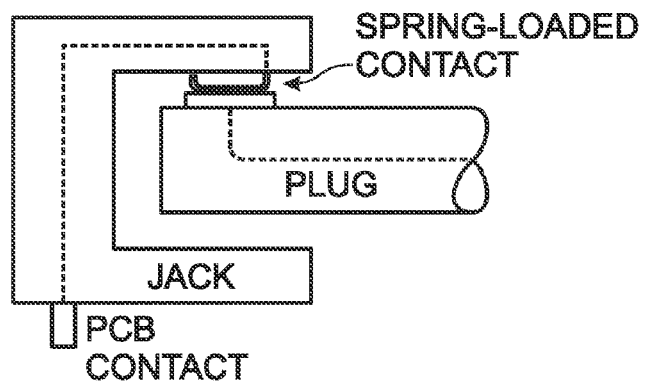
FIG. 2 is a partial cross-sectional view of an 8 Position 8 Contact (8P8C) interface (prior art).
Figure 5:
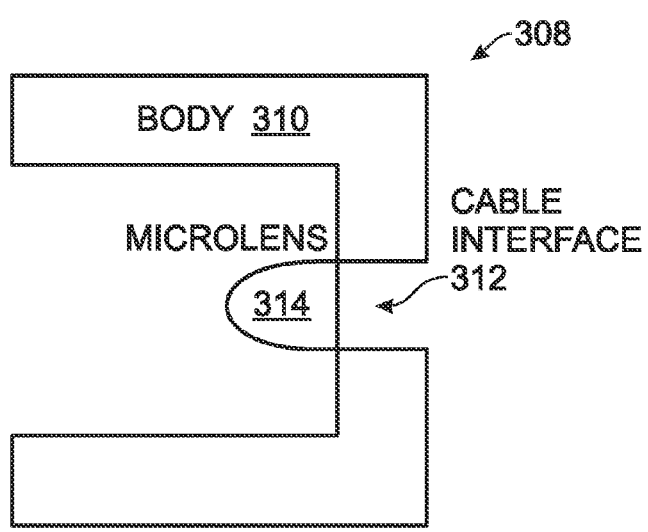
FIG. 5 is a partial cross-sectional view of a fiber optic cable plug.

FIG. 5 is a partial cross-sectional view of a fiber optic cable plug. The fiber optic cable plug is the same as the first plug 308 of FIG. 3. As such, the plug 308 comprises a one-piece mechanical body 310 for engaging a jack housing (not shown, see FIG. 6). The plug mechanical body includes a cable interface 312 to engage a fiber optic line end (not shown, see FIG. 3), and a microlens 314 to transceive light with the cable interface 312. Additional details can be found above in the explanation of FIGS. 3 and 4, and are not repeated here in the interest of brevity.

Figure 6A:
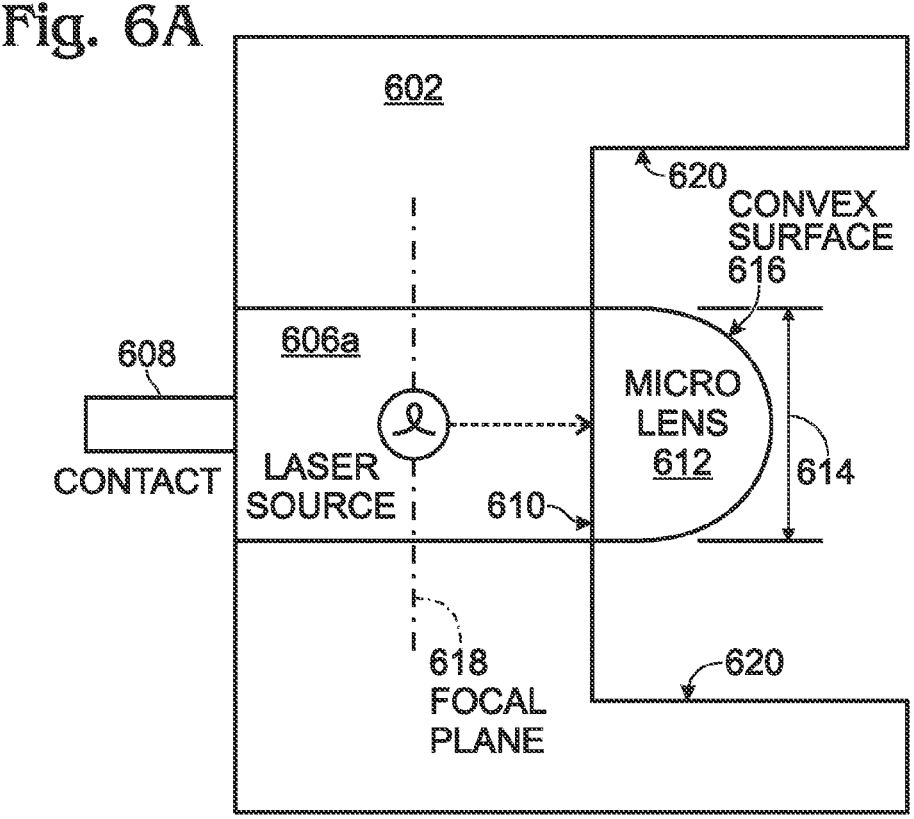
FIGS. 6A and 6B are partial cross-section views of a fiber optic cable jack.
Figure 6B:
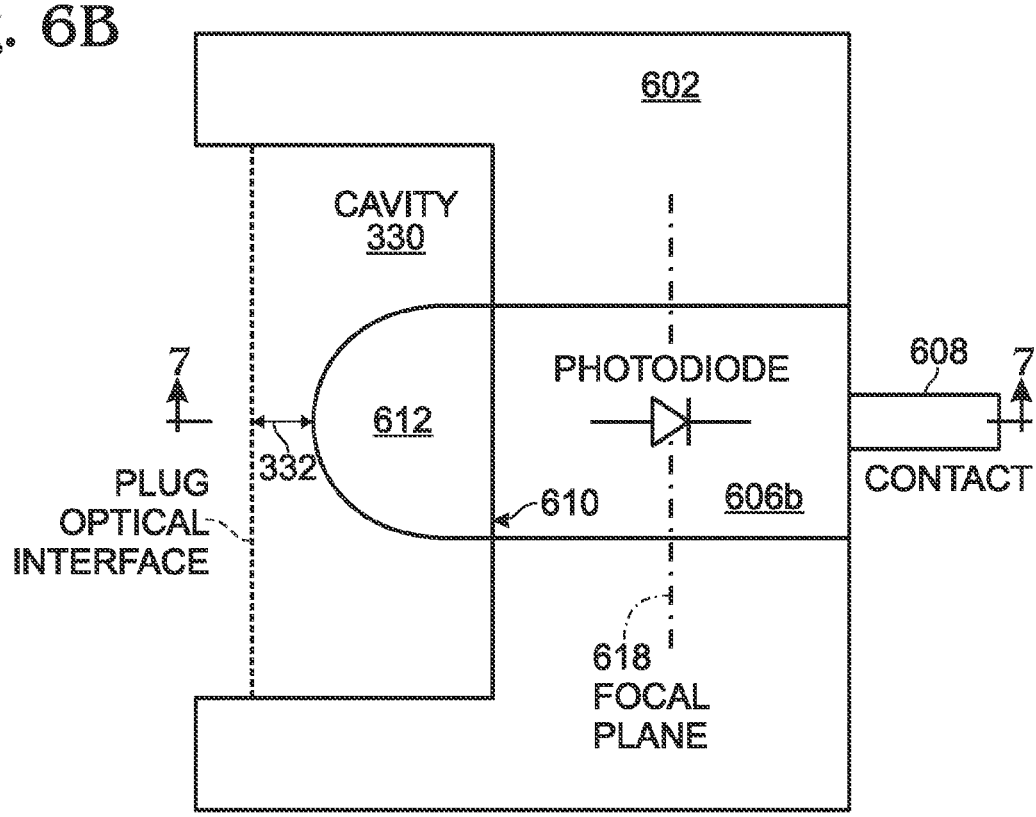

FIGS. 6A and 6B are partial cross-section views of a fiber optic cable jack. The jack 600 comprises a one-piece housing 602 for engaging a plug mechanical body (see FIGS. 3 and 5). The jack housing 602 includes a cable interface 608 to engage a printed circuit board (PCB) (not shown) and an optic element 606. In one aspect, the one-piece housing 602 is an injection molded plastic material.

As shown in FIG. 6A, the optic element is a laser source 606a (e.g., a laser diode). As shown in FIG. 6B, the optic element is a photodiode 606b. Referencing both FIGS. 6A and 6B, the optical element 606 has a first (electrical) interface connected to the contact 608 and a second (optical) interface 610. A microlens 612 is optically connected to the optic element second interface 610. As with the plug of FIGS. 3 and 5, the jack housing 602 may have the form factor of an 8P8C mechanical body (see FIG. 8).

Typically, the microlens 612 has a diameter 614 in the range of about 1-3 mm. The microlens 612 includes a convex surface 616 for interfacing with a plug optical interface (see FIG. 3) and the optic element 606 is formed in a focal plane 618 of the microlens 612. The jack housing 602 has inner walls 620 forming an air gap cavity 330 interposed between the microlens 612 and the engaging plug optical interface (not shown, see FIG. 3). The air gap cavity 330 has an air gap length 332 in a range of 0.1 to 1 mm.

As with the plug of FIG. 3, at least a portion of the housing 602 is transparent in the range of light wavelengths between 650 and 1800 nm, and the microlens 612 is formed in the transparent portion of the housing.

FIG. 7 is a plan view depicting a variation of fiber optic cable jack of FIG. 6B. A plurality of contacts 608a through 608n, where n is a variable, engage a PCB (not shown). There is a microlens 612a-612n associated with each contact 608. Note: the optic elements 606 may be laser sources, photodiodes, or a combination of laser sources and photodiodes.

FIG. 8 is a partial cross-sectional view of a fiber optic cable interface. In this aspect the plug and jacks have a form factor similar to an 8P8C interface. The fiber optic cable 800 comprises a cable section including a first fiber optic line 302 having a first end 304 and a second end 306. A first plug 308 includes a one-piece mechanical body 310 with a cable interface 312 to engage the fiber optic line first end 304, and a microlens 314 to transceive light between the fiber optic cable first end 304 and a first jack optical interface (i.e. microlens 612a) in the first jack housing 602a. A second plug 316 includes a one-piece mechanical 318 body with a cable interface 320 to engage the fiber optic line second end 306, and a microlens 322 to transceive light between the fiber optic cable second end 306 and a second jack optical interface (i.e. microlens 612b) in the second jack housing 602b.

A first jack 600a includes a one-piece housing 602a with a laser source 606a and a microlens optical interface 610 to transmit light from the laser source 606a to the microlens 312 of the first plug 308. The first jack housing 602a is shaped to engage the first plug mechanical body 310. A second jack 600b includes a one-piece housing 602b with a photodiode 60613 and a microlens optical interface 610b to transmit light from the microlens 612b of the second plug to the photodiode 606b. The second jack housing 602b is shaped to engage the second plug mechanical body 318. Additional details of the above-described plugs and jacks can be found in the explanations of FIGS. 3-7 above, which are not repeated in the interest of brevity.

As shown, each plug microlens 314/322 includes a convex surface 326 interfaced to the corresponding jack microlens 612a/612b. As in FIG. 3, each plug cable interface 310/320 is formed in a focal plane of its corresponding microlens 314/322. The first jack microlens 612a has a convex surface 616a interfaced to the convex surface 326 of the first plug microlens 314. Likewise, the second jack microlens 612b has a convex surface 616b interfaced to the convex surface 326 of the second plug microlens 322. Each optical element (laser source 606a or photodiode 606b) is formed in a focal plane of its corresponding microlens 612.

The first and second jack housings 602a/602b have walls with inner surfaces 620. The air gap cavities 330 interposed between each Plug microlens convex surface 326 and the engaging jack microlens convex surface 616, are surrounded by the jack inner surfaces 620.

Figure 9:
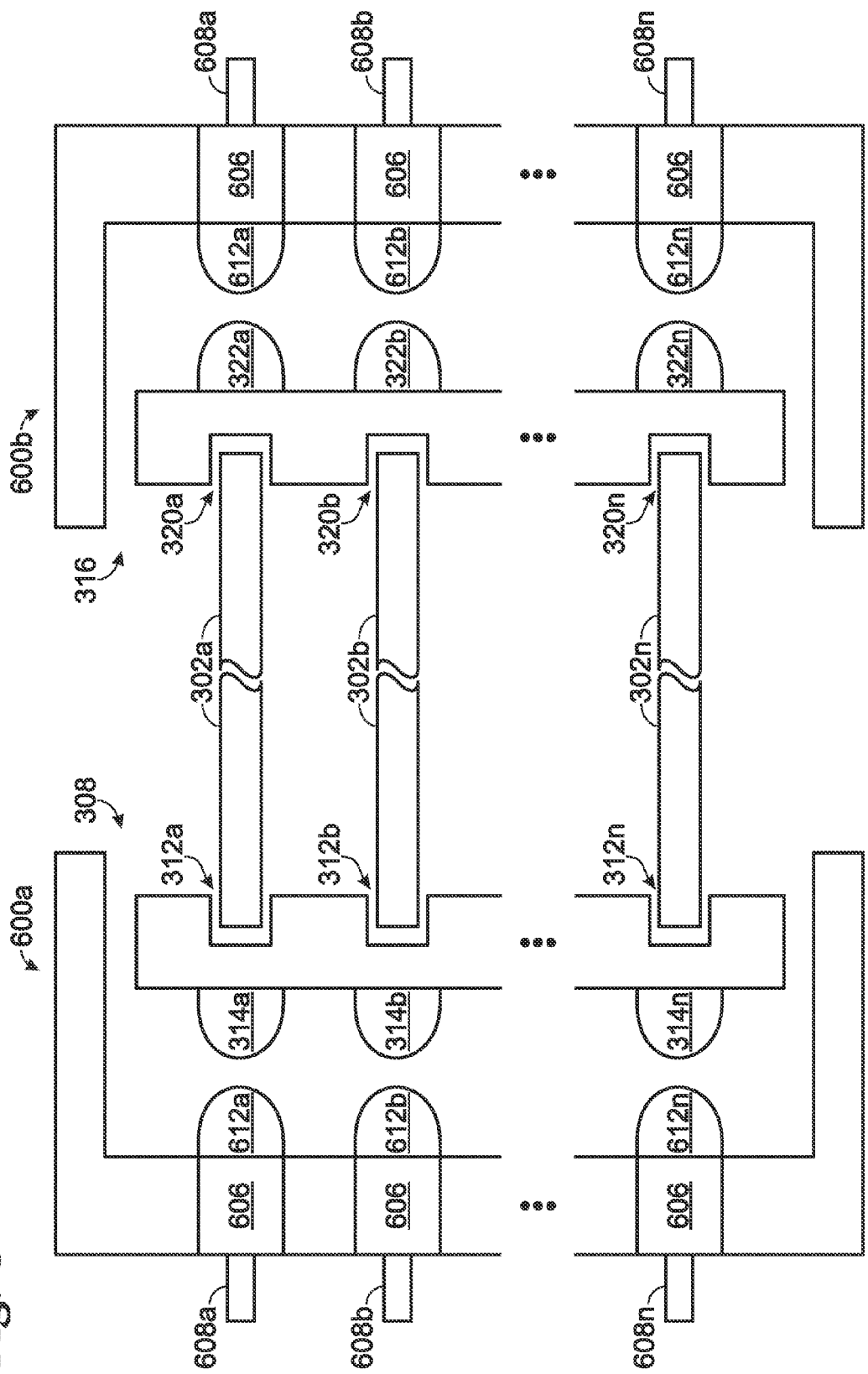
FIG. 9 is a plan view of a first variation of the fiber optic cable interface of FIG. 8.

FIG. 9 is a plan view of a first variation of the fiber optic cable interface of FIG. 8. Shown is a plurality of fiber optic lines 302a-302n. The first and second plugs 308/318 have a microlens 314a/322a through 314n/322n and cable interface 312a/320a through 312n/320n associated with each fiber optic line 302. Likewise, the first and second jacks 600a/600b have a microlens 616 associated with each fiber optic line. Note: the first jack may include an additional laser source associated with each fiber optic line. Alternately as shown, the first jack may be comprised of a combination of laser sources and photodiode optic elements. Likewise, the second jack may include an additional photodiodes associated with each fiber optic line. Alternately as shown, the second jack may be comprised of a combination of laser sources and photodiode optic elements.

Figure 10:
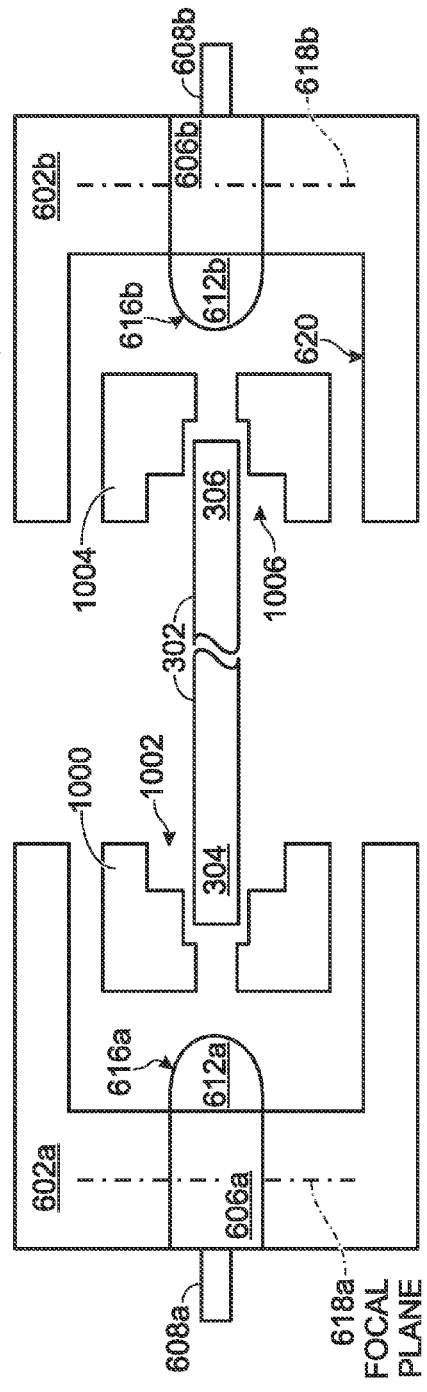
FIG. 10 is a plan view of a second variation of the fiber optic cable interface of FIG. 8.

FIG. 10 is a plan view of a second variation of the fiber optic cable interface of FIG. 8. In this aspect, the first and second jacks 600a and 600b are as described above in the explanation of FIG. 8. The difference is that the plugs do not include a microlens. Explicitly, a cable section includes a first fiber optic line 302 having a first end 304 and a second end 306. A first plug 1000 has a cable interface 1002 to engage the fiber optic line first end 304 and to transceive light between the fiber optic cable first end and a first jack optical interface (e.g., the convex surface 616a of the microlens 612a) in the first jack housing 602a. Likewise, a second plug 1004 has a cable interface 1006 to engage the fiber optic line second end 306 and to transceive light between the fiber optic cable second end 306 and a second jack optical interface (e.g., the convex surface 616b of the microlens 612b) in the second jack housing 602b.

FIG. 11 is a partial cross-sectional view depicting an off-axis misalignment compensating variation of the fiber optic cable plug of FIG. 5. The plug 1100 comprises a cable interface 1102 to engage a fiber optic core 1104 with an end 1106. A layer of cladding 1108 is also shown surrounding the core 1104. In one aspect the cladding diameter is about 0.49 mm and the core diameter is about 0.0625 mm. Typically, the cladding is covered with a buffer and plenum jacket, which is not shown because it is stripped away. The fiber optic core 1104 has a cross-sectional area (see FIG. 12). A housing 1110 has an outer surface 1112 for mechanically engaging a jack housing inner surface 1114 (shown in phantom). As defined herein, the plug is mechanically engaged with the jack when the jack is fully inserted into the plug. In some aspects, a locking mechanism is enabled when the plug and jack are mechanically engaged. An RJ-45 connector is one example of such a locking type mechanical engagement (as shown). In other aspects, mechanical engagement is obtained with a pressure or friction type fit. A universal serial bus (USB) connector is one example of a pressure/friction type of mechanical engagement. Alternately stated, a plug and jack are mechanically engaged when they are mated sufficiently to perform their intended electrical or optical functions.

A lens 1116 has a first surface 1118 to transceive an optical signal with a jack. The lens 1116 has a second surface 1120 to transceive optical signals with the fiber optic line core end 1106. The optical signal is represented by the dotted line reference designator 1122. Typically, the lens first surface 1118 is convex is shape and the second surface 1120 is plano (as shown). Alternately, the second surface may be convex (not shown). Although 2 rows of lens are shown, with associated cable interfaces, the plug is not limited to any particular number of rows. That is, there may be a single row of lens, or even a single lens. Also, as shown in FIG. 14, there is no limitation intended on the number of lens per row.

FIG. 12 is a cross-sectional view of FIG. 11, contrasting the lens first surface and core cross-sectional areas. The lens first surface 1118 has a cross-sectional area 1200 at least 30 times as large as the core cross-sectional area 1202. Note: the drawing is not necessarily to scale. It should also be noted that the cross-sectional area is defined herein as a two-dimensional that excludes the surface area associated with the curve of the lens (if any). Alternately stated, if the lens is curved (as shown in FIG. 11), the curved or three-dimensional cross-sectional area of the lens first surface is greater than 30 times the core cross-sectional area.

FIG. 13 is a partial cross-sectional view of the plug of FIG. 11, where the connecting jack is misaligned. The lens 1116 has an axis 1300. The lens convex first surface has a radius of curvature capable of receiving an optical signal beam with a beam axis 1302 of up to ±2 degrees ($\theta=2$ degrees) off from the lens axis 1300. The axis 1300 is defined as the vector that can be envisioned as the center of a light beam, originating from the fiber optic core end, and exiting the lens first surface 1118. Even when axes 1300 and 1302 are off by 2 degrees, due to loose tolerances in the mating jack/plug housings for example, the lens 1116 is able to focus the beam 1302 on the fiber optic line core end 1106.

Figure 14:
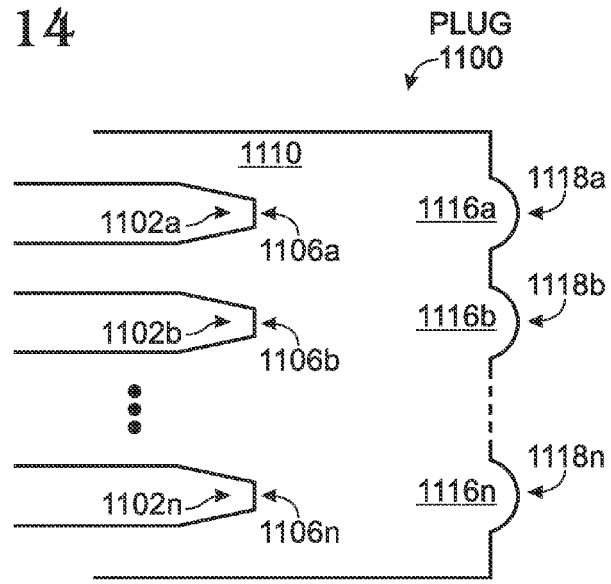
FIG. 14 is a partial cross-sectional view depicting a variation of the plug of FIG. 11.

FIG. 14 is a partial cross-sectional view depicting a variation of the plug of FIG. 11. As shown, the plug 1100 includes a plurality of cable interfaces 1102. Cable interfaces 1102a through 1102n are shown, where n is not limited to any particular value. In one aspect, n is equal to four. Since FIG. 11 shows two rows of lens, there would be a total of eight lens/cable interfaces when n=4. However, it should be understood that the plug is not limited to merely two rows. Each cable interface 1102 engages a fiber optic core end 1106. Likewise, the plug includes a plurality of lens 1116. Shown are core ends 1106a through 1106n, and lens 1116a through 1116n. Each lens 1116 has a first surface 1118 to transceive an optical signal with a jack. As above, each lens first surface 1118 has a cross-sectional area at least 30 times as large as the corresponding core cross-sectional area, and each lens having a second surface 1118 to transceive optical signals with the corresponding fiber optic line core end 1106.

Figure 15:
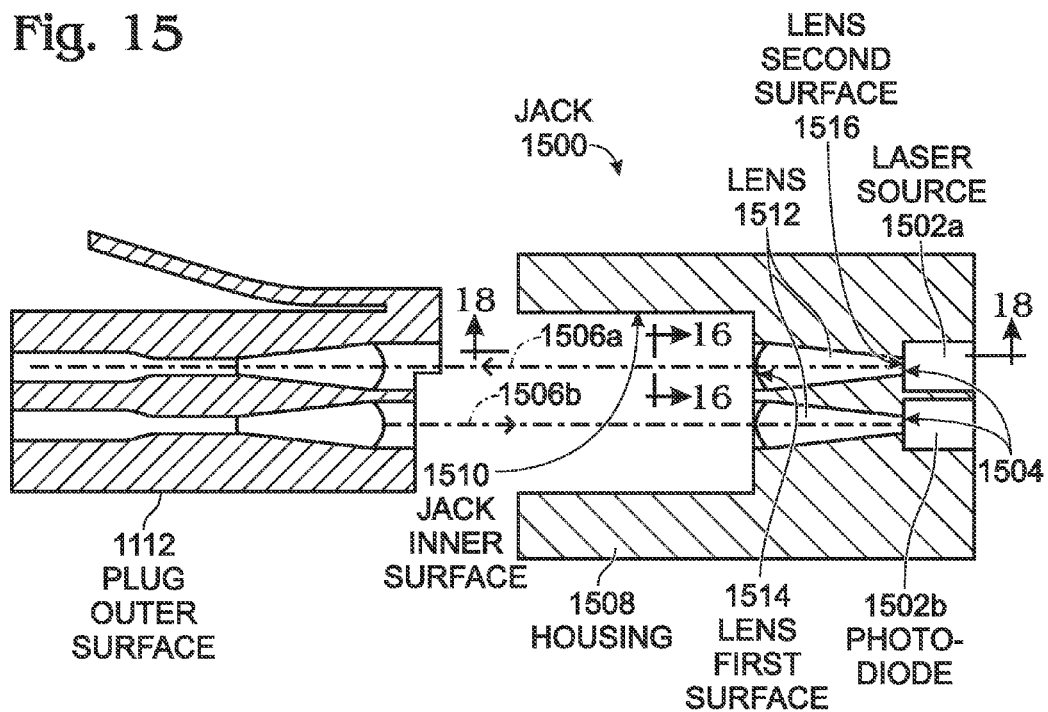
FIG. 15 is a partial cross-sectional views of the jack of FIGS. 6A and 6B, depicting an off-axis misalignment compensating mechanism.

FIG. 15 is a partial cross-sectional view of the jack of FIGS. 6A and 6B, depicting an off-axis misalignment compensating mechanism. The fiber optic cable jack 1500 comprises a laser source 1502a, a photodiode optic element 1502b, or a combination of laser sources and photodiodes. Although both a laser source and photodiode are shown, it should also be understood that the jack may be comprised of just a single row of optic elements, or even a single optic element. The optic element 1502 has an optical interface 1504 to transceive an optical signal beam 1506 with a cross-sectional area. A housing 1508 has an inner surface 1510 for mechanically engaging (as defined above) a plug housing outer surface 1112 (shown in phantom). A lens 1512 has a first surface 1514 to transceive (transmit or receive) an optical signal with a plug. The lens 1512 has a second surface 1516 to transceive optical signals with the optic element 1502. As shown, the first surface 1514 is convex and the second surface 1516 is plano. However, the lens may be configured with other lens shapes and combinations.

Figure 16:
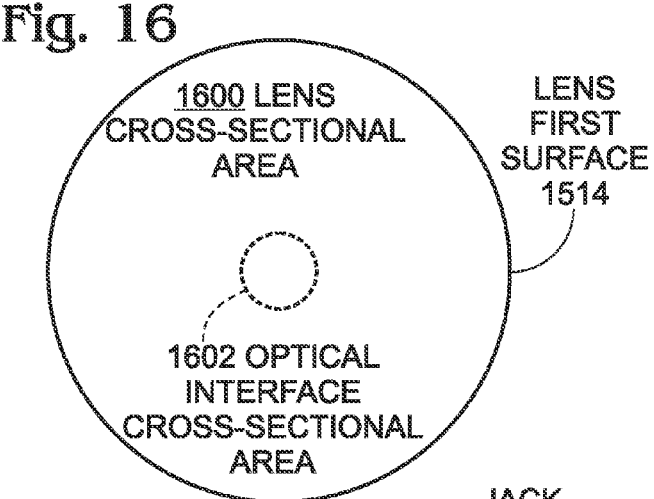
FIG. 16 is a cross-sectional view of FIG. 15, contrasting the lens first surface and optical interface cross-sectional areas.

FIG. 16 is a cross-sectional view of FIG. 15, contrasting the lens first surface and optical interface cross-sectional areas. The first surface 1514 has a cross-sectional area 1600 at least 30 times as large as the optical interface 1504 cross-sectional area 1602. The drawing is not necessarily to scale. It should be noted that the cross-sectional area is defined herein as a two-dimensional that excludes the surface area associated with the curve of the lens (if any). Alternately stated, if the lens is curved (as shown in FIG. 15), the curved or three-dimensional cross-sectional area of the lens first surface is greater than 30 times the core cross-sectional area 1602.

Figure 17:
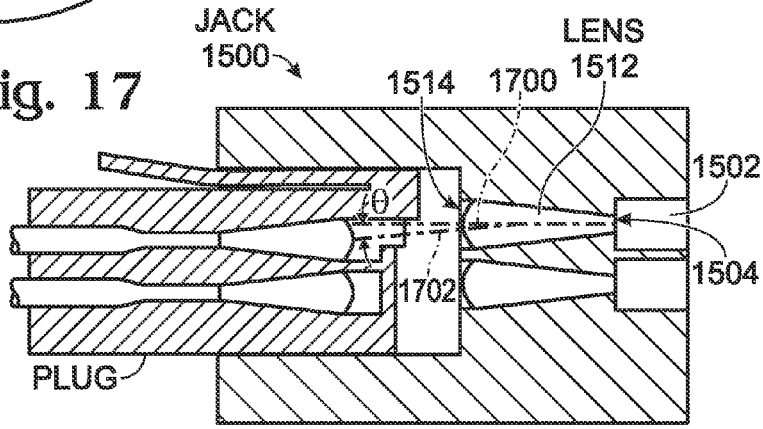
FIG. 17 is a partial cross-sectional view of the jack of FIG. 15, where the plug is misaligned with a connecting plug.

FIG. 17 is a partial cross-sectional view of the jack of FIG. 15, where the plug is misaligned with a connecting plug. The lens 1512 has an axis 1700 and the lens convex first surface 1514 has a radius of curvature capable of transceiving an optical signal beam with a beam axis 1702 of up to ±2 degrees off from the lens axis 1700. The axis 1700 is defined as the vector that can be envisioned as the center of a light beam, originating from the optical interface, and exiting the lens first surface 1514. Even with up to 2 degrees misalignment, due to misalignment of the plug/jack housing for example, the lens 1512 is able to focus the beam on the optic element optical interface 1504. By transceiving, it is meant that when the optic element is a photodiode as shown, the lens 1512 is able to receive a misaligned optic signal and focus that center axis of that signal beam on the optical interface 1504. When the optic element is a laser source, the lens is able to transmit an optical signal from the optical interface along axis 1700. As explained above, when the jack and plug axes are misaligned, the plug lens is able to compensate.

Figure 18:
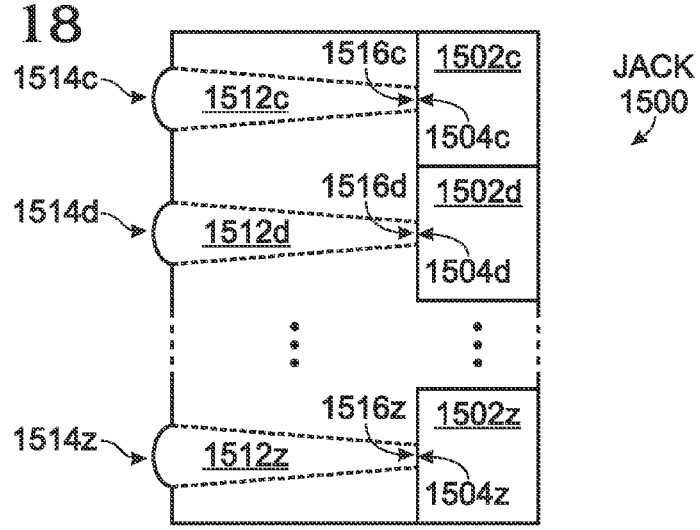
FIG. 18 is a partial cross-sectional view depicting a variation of the jack of FIG. 15.

FIG. 18 is a partial cross-sectional view depicting a variation of the jack of FIG. 15. The jack comprises a plurality of optic elements. Optic elements 1502*c* through 1502*z* are shown, where z is a variable not limited to any particular value. In one aspect, there are eight optic elements. Since FIG. 15 shows 2 rows of lens/optic elements, a total of eight lens/optic element combination can be obtained with 4 per row. The optic elements may be laser sources, photodiode, or a combination of laser sources and photodiodes. Each optic element 1502 has an optical interface 1504 to transceive an optical signal beam. A plurality of lenses, 1512*c*-1512*z*, are shown. Each lens 1512 has a first surface 1514 to transceive an optical signal with a plug. The first surface has a cross-sectional area at least 30 times as large as the corresponding optical interface 1514 cross-sectional area, as shown in FIG. 16. Each lens 1512 has a second surface 1516 to transceive optical signals with the corresponding optic element 1502.

Figure 19:
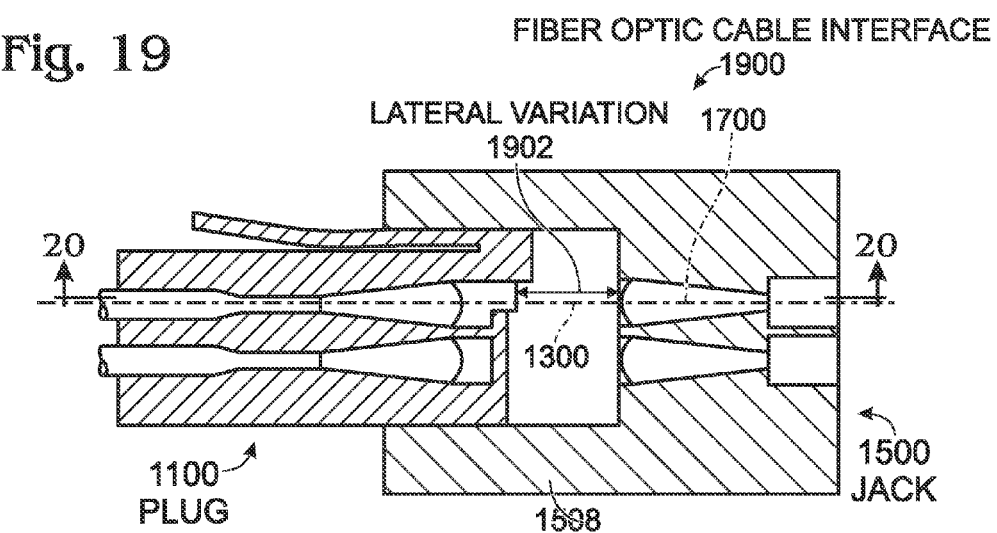
FIG. 19 is a partial cross-sectional diagram depicting an off-axis misalignment compensating fiber optic cable interface.

FIG. 19 is a partial cross-sectional diagram depicting an off-axis misalignment compensating fiber optic cable interface. The fiber optic cable interface 1900 comprises a plug as described above and shown in FIGS. 11-14. The plug 1100 mechanically engages a jack as described above and shown if FIGS. 15-18. The plug lens axis 1300 is nominally aligned with jack lens axis 1700. However, a variation of up to ±2 degrees between axes 1300 and 1700 when the plug is mechanically engaged to the jack still enables the transceiving of optical signals between the plug core and the jack optic element. Further, the plug housing 1110 has a lateral variation 1902 of up to ±1 mm when mechanically engaged to the jack housing 1508. The details of the jack 1500 and plug 1100 are as described above, and are not repeated here in the interest of brevity.

Figure 20:
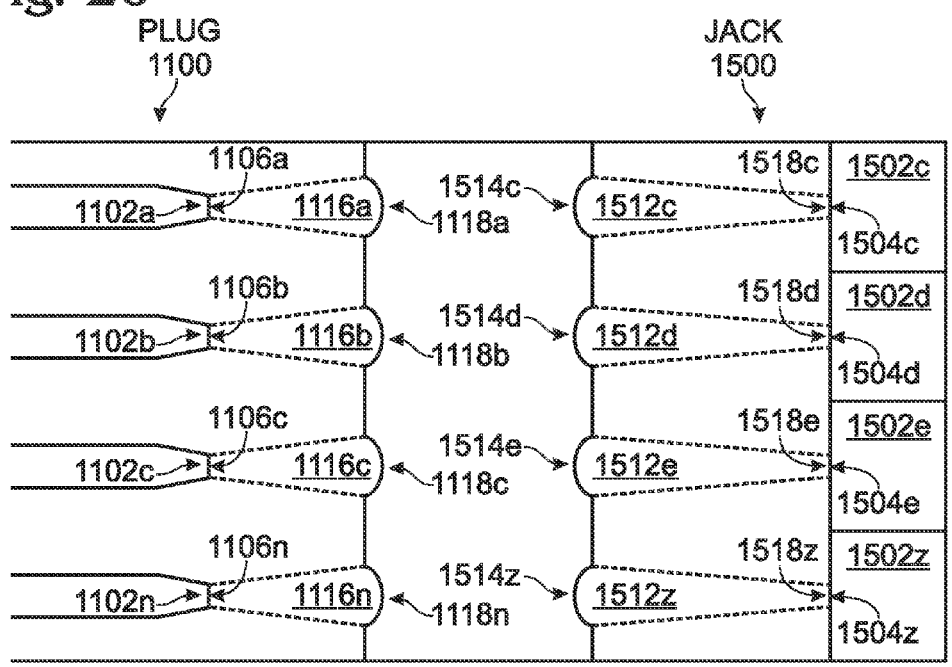
FIG. 20 is a cross-sectional view depicting a variation of the fiber optic cable interface of FIG. 19.

FIG. 20 is a cross-sectional view depicting a variation of the fiber optic cable interface of FIG. 19. In this aspect the plug 1100 includes a housing 1110 with a plurality of cable interfaces 1102. Cable interfaces 1102*a* through 1102*n* are shown, where n is not limited to any particular value. As shown, n is equal to four, making a total of eight cable interfaces. However, it should be understood that the interface is not limited to any particular number of rows, or cable interfaces per row. Each cable interface 1102 engages a fiber optic core end 1106. Likewise, the plug includes a plurality of lens 1116. Shown are core ends 1106*a* through 1106*n*, and lens 1116*a* through 1116*n*. Each lens 1116 has a first surface 1118 to transceive an optical signal with a jack. As above, each lens first surface 1118 has a cross-sectional area at least 30 times as large as the corresponding core cross-sectional area, and each lens has a second surface 1118 to transceive optical signals with the corresponding fiber optic line core end 1106.

The jack 1500 comprises housing 1508 with a plurality of optic elements 1502. Optic elements 1502*c* through 1502*z* are shown, where z is a variable not limited to any particular value. In one aspect, there are eight optic elements. The optic elements may be laser sources, photodiode, or a combination of laser sources and photodiodes. Each optic element 1502 has an optical interface 1504 to transceive an optical signal beam. A plurality of lens, 1512*c*-1512*z*, are shown. Each lens 1512 has a first surface 1514 to transceive an optical signal with a plug. The first surface has a cross-sectional area at least 30 times as large as the corresponding optical interface 1514 cross-sectional area, as shown in FIG. 16. Each lens 1512 has a second surface 1518 to transceive optical signals with the corresponding optic element 1502.

FIG. 21 is a cross-sectional view depicting an off-axis misalignment compensating fiber optic cable assembly. The cable assembly 2100 comprises a first plug 1100*a* and a second plug 1100*b*. As described above, each plug includes a cable interface 1102, a housing 1110, and a lens 1116. Details of the plug are the same as described in the explanation of FIGS. 11-14, and are not repeated here in the interest of brevity. A cable with a fiber optic line 2102 is interposed between the cable interfaces 1102*a* and 1102*b* of the first and second plugs. In one aspect as shown, the first and second plugs 1100*a*/1100*b* include a plurality of cable interfaces 1102. Shown are cable interfaces a through n, where n is a variable not limited to any particular value. In this example however, there are eight cable interfaces, 2 rows of 4 cable interfaces. However, there is no limitation with respect to the number of rows or interfaces per row. The cable includes a plurality of fiber optic lines 2102*a*-2102*n* interposed between the first and second plugs. Generally, the microlenses, the jack bodies, and plug housings result in a low cost alternative to conventional optical connectors. One low cost feature comes from the fact that the lens need not be built separately from glass, but may be molded out of the body material in the same step as used to build the body. As noted above, the microlens and body/housing can be fabricated in the same process using injection molding.

Fiber optic cable jacks and plugs have been provided, built from one-piece bodies and housings that incorporate a microlens. Some examples of particular housing designs and dimensions have been given to illustrate the invention. However, the invention is not limited to merely these examples. Fiber optic cables have been shown ending with plugs, but alternately the fiber optical cable interfaces can be made using jacks instead of plugs, or a combination of a plug on one end and jack on the other end. Other variations and embodiments of the invention will occur to those skilled in the art.

We claim:

1. An off-axis misalignment compensating fiber optic cable plug comprising:
   a cable interface to engage a fiber optic core end, where the fiber optic core has a cross-sectional area;
   a housing having an outer surface for selectively engaging a jack housing inner surface without permanently fixing the plug housing to the jack housing, the plug housing having a lateral tolerance when engaged with the jack housing;
   a lens formed in the housing having a first surface to transceive an optical signal with a connected jack connector lens, the first surface having a cross-sectional area at least 30 times as large as the core cross-sectional area to compensate for the lateral tolerance, the lens having a second surface to transceive optical signals with the fiber optic line core end; and,
   an air gap cavity formed between the plug lens first surface and the connected jack connector lens, having an air gap length responsive to the lateral tolerance.

2. The plug of claim 1 wherein the lens has an axis and the lens first surface is convex with a radius of curvature capable of receiving an optical signal beam with a beam axis of up to ±2 degrees off from the lens axis, and focusing the beam on the fiber optic line core end.

3. The plug of claim 2 wherein the lens second surface is a plano surface.

4. The plug of claim 1 further comprising:
   a first plurality of cable interfaces, each cable interface engaging a fiber optic core end;
   a first plurality of lenses, each lens having a first surface to transceive an optical signal with a corresponding lens of the connected jack connector, the first surface having a cross-sectional area at least 30 times as large as the corresponding core cross-sectional area, and each lens having a second surface to transceive optical signals with the corresponding fiber optic line core end; and,
   a first plurality of air gap cavities, each formed between a plug lens first surface and the corresponding lens of the connected jack connector.

5. The plug of claim 4 where the first plurality is equal to eight.

6. An off-axis misalignment compensating fiber optic cable jack comprising:
   an optic element selected from a group consisting of a laser source and a photodiode, having an optical interface to transceive an optical signal beam with a cross-sectional area;
   a housing with an inner surface for selectively engaging a plug housing outer surface without permanently fixing the plug housing to the jack housing, the jack housing having a lateral tolerance when engaged with the plug housing;
   a lens formed in the housing having a first surface to transceive an optical signal with a connected plug connector lens, the first surface having a cross-sectional area at least 30 times as large as the optical interface cross-sectional area to compensate for the lateral tolerance, the lens having a second surface to transceive optical signals with the optic element; and,
   an air gap cavity formed between the jack lens first surface and the connected plug connector lens, having an air gap length responsive to the lateral tolerance.

7. The jack of claim 6 wherein the lens has an axis and the lens first surface is convex with a radius of curvature capable of transceiving an optical signal beam with a beam axis of up to ±2 degrees off from the lens axis, with the beam focused on the optic element optical interface.

8. The jack of claim 7 wherein the lens second surface is a plano surface.

9. The jack of claim 6 further comprising:
   a first plurality of optic elements, each optic element having an optical interface to transceive an optical signal beam;
   a first plurality of lens, each lens having a first surface to transceive an optical signal with a corresponding lens of the connected plug connector, the first surface having a cross-sectional area at least 30 times as large as the corresponding optical interface cross-sectional area, and each lens having a second surface to transceive optical signals with the corresponding optic element; and,
   a first plurality of air gap cavities, each formed between a jack lens first surface and the corresponding lens of the connected plug connector.

10. The jack of claim 9 where the first plurality is equal to eight.

11. An off-axis misalignment compensating fiber optic cable interface comprising:
    a plug including:
       a cable interface to engage a fiber optic core end with a cross-sectional area;
       a plug housing having an outer surface for selectively engaging a jack housing inner surface without permanently fixing the plug housing to the jack housing, the plug housing having a lateral tolerance when engaged with the jack housing;
       a lens formed in the plug housing having a first axis, a first surface to transceive an optical signal with a connected jack connector lens, and a second surface to transceive optical signals with the fiber optic line core end;
    a jack including:
       an optic element selected from a group consisting of a laser source and a photodiode, having an optical interface to transceive an optical signal beam with a cross-sectional area;
       a jack housing with an inner surface for selectively engaging the plug housing outer surface without permanently fixing the jack housing to the plug housing, the jack housing having a lateral tolerance;
       a lens formed in the jack housing having a second axis nominally aligned with the first axis, a first surface to transceive an optical signal with the connected plug connector lens first surface, and a second surface to transceive optical signals with the optical interface; and,
    an air gap cavity formed between the plug lens first surface and the jack lens first surface, having an air gap length responsive to the plug housing and jack housing lateral tolerances.

12. The cable interface of claim 11 wherein the plug housing has a lateral variation of up to ±1 mm when mechanically engaged to the jack housing.

13. The cable interface of claim 11 wherein the plug lens has a cross-sectional area at least 30 times as large as a the fiber optic core cross-sectional area; and,
    wherein the jack lens first surface has a cross-sectional area at least 30 times as large as the optical interface beam cross-sectional area.

14. The cable interface of claim 13 wherein the plug lens first surface is convex with a radius of curvature capable of receiving an optical signal beam with a beam axis of up to ±2 degrees off from the lens axis, and focusing the beam on the fiber optic core end.

15. The cable interface of claim 14 wherein the plug lens second surface is a plano surface.

16. The cable interface of claim 13 wherein the jack lens first surface is convex with a radius of curvature capable of transceiving an optical signal beam with a beam axis of up to ±2 degrees off from the lens axis, with the beam focused on the optic element optical interface.

17. The cable interface of claim 16 wherein the jack lens second surface is a plano surface.

18. The cable interface of claim 11 wherein the plug further includes:
- a first plurality of cable interfaces, each cable interface engaging a fiber optic core end;
- a first plurality of lens, each lens having a first surface to transceive an optical signal with a corresponding jack lens, the first surface having a cross-sectional area at least 30 times as large as the corresponding core cross-sectional area, and each lens having a second surface to transceive optical signals with the corresponding fiber optic line core end;

wherein the jack further includes:
- a first plurality of optic elements, each optic element having an optical interface to transceive an optical signal beam; and,
- a first plurality of lens, each lens having a first surface to transceive an optical signal with a corresponding plug lens first surface, the first surface having a cross-sectional area at least 30 times as large as the corresponding optical interface cross-sectional area, and each lens having a second surface to transceive optical signals with the corresponding optic element; and,
- an air gap cavity formed between each plug lens first surface and the corresponding jack lens first surface.

19. The cable interface of claim 18 wherein the first plurality is equal to eight.

20. An off-axis misalignment compensating fiber optic cable assembly comprising:
- a first plug and a second plug, each plug including:
  - a cable interface to engage a fiber optic core end, where the fiber optic core has a cross-sectional area;
  - a housing having an outer surface for selectively engaging a jack housing inner surface without permanently fixing each plug housing to the corresponding jack housing, each plug housing having a lateral tolerance when engaged with the corresponding jack housing; and
  - a lens having a first surface to transceive an optical signal with a connected jack connector lens, the first surface having a cross-sectional area at least 30 times as large as the core cross-sectional area to compensate for the lateral tolerance, the lens having a second surface to transceive optical signals with the fiber optic line core end;
- a cable with a fiber optic line interposed between the cable interfaces of the first and second plugs; and,
- an air gap cavity formed between each plug lens first surface and the corresponding jack lens, each air gap cavity having an air gap length responsive to the lateral tolerance.

21. The cable assembly of claim 20 wherein the first and second plugs include a first plurality of cable interfaces; and,
wherein the cable includes a first plurality of fiber optic lines interposed between the first and second plugs.

22. The cable assembly of claim 21 wherein the first plurality is equal to eight.

23. The cable interface of claim 11 wherein the plug lens first axis has a variation of up to ±2 degrees from the jack lens second axis when plug is mechanically engaged to the jack.

* * * * *

UNITED STATES PATENT AND TRADEMARK OFFICE
CERTIFICATE OF CORRECTION

| | |
|---|---|
| PATENT NO. | : 8,113,721 B1 |
| APPLICATION NO. | : 12/581799 |
| DATED | : February 14, 2012 |
| INVENTOR(S) | : Igor Zhovnirovsky et al. |

It is certified that error appears in the above-identified patent and that said Letters Patent is hereby corrected as shown below:

In column 12, line 8 (Claim 20), the word "having" has been incorrectly printed as "haying".

Column 12, lines 3-26, Claim 20 should be printed as follows:

20. An off-axis misalignment compensating fiber optic cable assembly comprising:
    a first plug and a second plug, each plug including:
        a cable interface to engage a fiber optic core end, where the fiber optic core has a cross-sectional area;
        a housing having an outer surface for mechanically selectively engaging a jack housing inner surface without permanently fixing each plug housing to the corresponding jack housing, each plug housing having a lateral tolerance when engaged with the corresponding jack housing; and
        a lens having a first surface to transceive an optical signal with a connected jack connector lens, the first surface having a cross-sectional area at least 30 times as large as the core cross-sectional area to compensate for the lateral tolerance, the lens having a second surface to transceive optical signals with the fiber optic line core end;
    a cable with a fiber optic line interposed between the cable interfaces of the first and second plugs; and,
    an air gap cavity formed between each plug lens first surface and the corresponding jack lens, each air gap cavity having an air gap length responsive to the lateral tolerance.

Signed and Sealed this
Twenty-seventh Day of March, 2012

David J. Kappos
*Director of the United States Patent and Trademark Office*